United States Patent
Nachum

(10) Patent No.: US 10,389,638 B1
(45) Date of Patent: Aug. 20, 2019

(54) ACTIVATING AN ALTERNATE TREE FLOW CONTROL FOR SPANNING TREE PROTOCOL (STP) IN COMMUNICATION NETWORKS

(71) Applicant: MARVELL INTERNATIONAL LTD., Hamilton (BM)

(72) Inventor: Gai Nachum, Rishon le Zion (IL)

(73) Assignee: Marvell International Ltd., Hamilton (BM)

( * ) Notice: Subject to any disclaimer, the term of this patent is extended or adjusted under 35 U.S.C. 154(b) by 198 days.

(21) Appl. No.: 15/163,467

(22) Filed: May 24, 2016

Related U.S. Application Data

(62) Division of application No. 13/598,018, filed on Aug. 29, 2012, now Pat. No. 9,363,181.

(60) Provisional application No. 61/528,644, filed on Aug. 29, 2011.

(51) Int. Cl.
 *H04L 12/753* (2013.01)
 *H04L 12/825* (2013.01)
 *H04L 12/803* (2013.01)

(52) U.S. Cl.
 CPC ............ *H04L 47/122* (2013.01); *H04L 45/48* (2013.01); *H04L 47/26* (2013.01)

(58) Field of Classification Search
 CPC ........ H04L 47/122; H04L 45/48; H04L 47/26
 See application file for complete search history.

(56) References Cited

U.S. PATENT DOCUMENTS

| | | |
|---|---|---|
| 9,363,181 B1 | 6/2016 | Nachum |
| 2006/0215550 A1 | 9/2006 | Malhotra |
| 2008/0112323 A1 | 5/2008 | Agmon et al. |
| 2010/0309811 A1 | 12/2010 | Tanaka et al. |
| 2011/0194411 A1 | 8/2011 | Croft et al. |
| 2012/0257501 A1* | 10/2012 | Kucharczyk ............ H04L 47/30 370/235 |

OTHER PUBLICATIONS

IEEE Std 802.3-2002, "IEEE Standard for Information technology—Telecommunications and information exchange between systems—Local and metropolitan area networks—Specific requirements, Part 3: Carrier sense multiple access with collision detection (CSMA/CD) access method and physical layer specifications," *The Institute of Electrical and Electronics Engineers, Inc.*, 379 pages (Mar. 8, 2002).

(Continued)

*Primary Examiner* — Andrew Lai
*Assistant Examiner* — M Mostazir Rahman

(57) ABSTRACT

A network device activates an alternative path flow control for spanning tree protocol. The network device includes a receiver that receives first network traffic from a first transmitter of the first network traffic, the first network traffic being destined for a first receiver along a first network path, and receives second network traffic from the first receiver, the second network traffic being destined for at least the first transmitter along a second network path. The network device also has a pause frame detector configured to detect in the second network traffic a pause frame for controlling a flow of the first network traffic. The network device, furthermore, has an alternative network path activator configured to activate, a third network path that is different from the first network path, for transmitting the first network traffic to the first receiver.

21 Claims, 5 Drawing Sheets

(56) References Cited

OTHER PUBLICATIONS

IEEE Std 802.3-2005, "IEEE Standard for Information technology—Telecommunications and information exchange between systems—Local and metropolitan area networks—Specific requirements, Part 3: Carrier sense multiple access with collision detection (CSMA/CD) access method and physical layer specifications," *The Institute of Electrical and Electronics Engineers, Inc.*, Sections 1-5, 2695 pages (Dec. 9, 2005).

IEEE Draft P802.3ae/D5.0 Supplement to Carrier Sense Multiple Access with Collision Detection (CSMA/CD) Access Method & Physical Layer Specifications—Media Access Control (MAC) Parameters, Physical Layer, and Management Parameters for 10 Gb/s Operation *The Institute of Electrical and Electronics Engineers, Inc.*, 540 pages (May 1, 2002).

Chen, "Home Network Basis: Transmission Environments and Wired/Wireless Protocols," Prentice Hall, 26 pages (2006).

IEEE Std 802.1Q, 2003 Edition, "IEEE Standards for Local and Metropolitan area networks—Virtual Bridged Local Area Networks," *The Institute of Electrical and Electronics Engineers, Inc.*, 327 pages (May 7, 2003).

IEEE Std 802.1Q-2011 (Revision of IEEE Std.802.1Q-2005), "IEEE Standard for Local and Metropolitan Area Networks—Media Access Control (MAC) Bridges and Virtual Bridged Local Area Networks," The Institute of Electrical and Electronics Engineers, Inc., 1,365 pages (Aug. 31, 2011).

IEEE P802.1aq/D4.6, Draft Amendment to IEEE Std 802.1Q-2011, "IEEE Draft Standard for Local and Metropolitan Area Networks—Media Access Control (MAC) Bridges and Virtual Bridged Local Area Networks—Amendment XX: Shortest Path Bridging," The Institute of Electrical and Electronics Engineers, Inc., 363 pages (Feb. 10, 2012).

IEEE P802.1ad/D6.0, Draft Amendment to IEEE Std 802.1Q, "IEEE Draft Standard for Local and Metropolitan Area Networks—Virtual Bridged Local Area Networks—Amendment 4: Provider Bridges," *The Institute of Electrical and Electronics Engineers, Inc.*, 60 pages (Aug. 17, 2005).

IEEE Std 802.1Q™—2014 (Revision of IEEE Std.802.1Q-2011), "IEEE Standard for Local and Metropolitan Area Networks—Bridges and Bridged Networks," *The Institute of Electrical and Electronics Engineers, Inc.*, 1,832 pages (Nov. 3, 2014).

IEEE Std 802.1Qau, Amendment to IEEE Std 802 1Q-2005,"Virtual Bridged Local Area Networks—Amendment 13: Congestion Notification" The Institute of Electrical and Electronics Engineers, Inc., 135 pages, (Apr. 2010).

IEEE Std 802.3-2005 (revision), "IEEE Standard for Information technology—Telecommunications and information exchange between systems—Local and metropolitan area networks—Specific requirements, Part 3: Carrier Sense Multiple Access with Collision Detection (CSMA/CD) access method and physical layer specifications," The Institute of Electrical and Electronics Engineers, Inc., 417 pages (2005).

\* cited by examiner

US 10,389,638 B1

ACTIVATING AN ALTERNATE TREE FLOW CONTROL FOR SPANNING TREE PROTOCOL (STP) IN COMMUNICATION NETWORKS

CROSS-REFERENCE TO RELATED APPLICATION

The present invention is a divisional application of U.S. application Ser. No. 13/598,018, filed Aug. 29, 2012, which claims priority from U.S. Provisional Patent Application No. 61/528,644 filed Aug. 29, 2011, the disclosures of which are incorporated herein in their entirety by reference.

BACKGROUND

Field

The current disclosure relates to data communications, and particularly to activating alternate tree flow control for Spanning Tree Protocol (STP) in communication networks.

Background

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

STP protocol is used to determine an optimized link for packets through a network. However, when a receiver or intermediate node along a link is slower than a transmitter, the receiver needs to modulate traffic it receives by sending pause frames to upstream network devices. In such cases, not only a particular link, but an entire section of a network can be slowed down.

SUMMARY

One or more embodiments of the disclosure relate to activating an alternate tree flow control for Spanning Tree Protocol (STP) in communication networks.

According to an embodiment, there is provided a network device in a computer network that includes an ingress module configured to receive first network traffic from a first transmitter of the first network traffic, the first network traffic being destined for a first receiver along a first network path, and receive second network traffic from the first receiver, the second network traffic being destined for at least the first transmitter along a second network path. Further, the network device includes a pause frame detector configured to detect in the second network traffic a pause frame for controlling a flow of the first network traffic. Also, the network device includes an alternative network path activator configured to activate, a third network path, that is different from the first network path, for transmitting the first network traffic to the first receiver. The alternative network path activator is configured to carry out the activation of the third network path in response to one or more criteria, including: detecting of the pause frame in the second network traffic.

The pause frame detector may be further configured to detect an IEEE 802.3x compliant pause frame.

The alternative network path activator may be further configured to carry out the activation of the third network path in response to a fullness level of a queue corresponding to the first network traffic.

The alternative network path activator may be further configured to carry out the activation of the third network path in response to both the detecting of the pause frame in the second network traffic and the fullness level of the queue corresponding to the first network traffic.

The alternative network path activator may be further configured to activate the third network path consistent with spanning tree protocol.

According to another embodiment, a network device in a computer network includes an ingress module configured to receive first network traffic from a first transmitter of the first network traffic, the first network traffic being destined for a first receiver along a first network path, and receive second network traffic from the first receiver, the second network traffic being destined for at least the first transmitter. Further, the network device includes a pause frame detector configured to detect in the second network traffic a first pause frame for controlling a flow of the first network traffic, and a pause frame processor module configured to process the detected first pause frame so as to generate a second pause frame that includes an address corresponding to the first receiver. Further, the network device includes an egress module configured to transmit the processed second pause frame in the second network traffic that is destined for at least the first transmitter.

According to another embodiment, a method of controlling a traffic flow in a computer network, includes receiving first network traffic from a first transmitter of the first network traffic, the first network traffic being destined for a first receiver along a first network path, and receiving second network traffic from the first receiver, the second network traffic being destined for at least the first transmitter along a second network path. Further, the method includes detecting, by a pause frame detector, a pause frame in the second network traffic for controlling a flow of the first network traffic and activating, by an alternative network path activator, a third network path, that is different from the first network path, for transmitting the first network traffic to the first receiver. The activation of the third network path is in response to one or more criteria, including: the detecting of the pause frame in the second network traffic.

According to another embodiment, a method of controlling a traffic flow in a computer network, includes receiving first network traffic from a first transmitter of the first network traffic, the first network traffic being destined for a first receiver along a first network path, receiving second network traffic from the first receiver, the second network traffic being destined for at least the first transmitter, detecting, by a pause frame detector, a first pause frame in the second network traffic for controlling a flow of the first network traffic, processing, by a processor module, the detected first pause frame so as to generate a second pause frame that includes an address corresponding to the first receiver, and transmitting the processed second pause frame in the second network traffic that is destined for at least the first transmitter.

DRAWINGS

DETAILED DESCRIPTION

Embodiments will be described below in more detail with reference to the accompanying drawings. The following detailed descriptions are provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The terms used in the description are intended to describe embodiments only, and shall by no means be restrictive. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Figure 1:
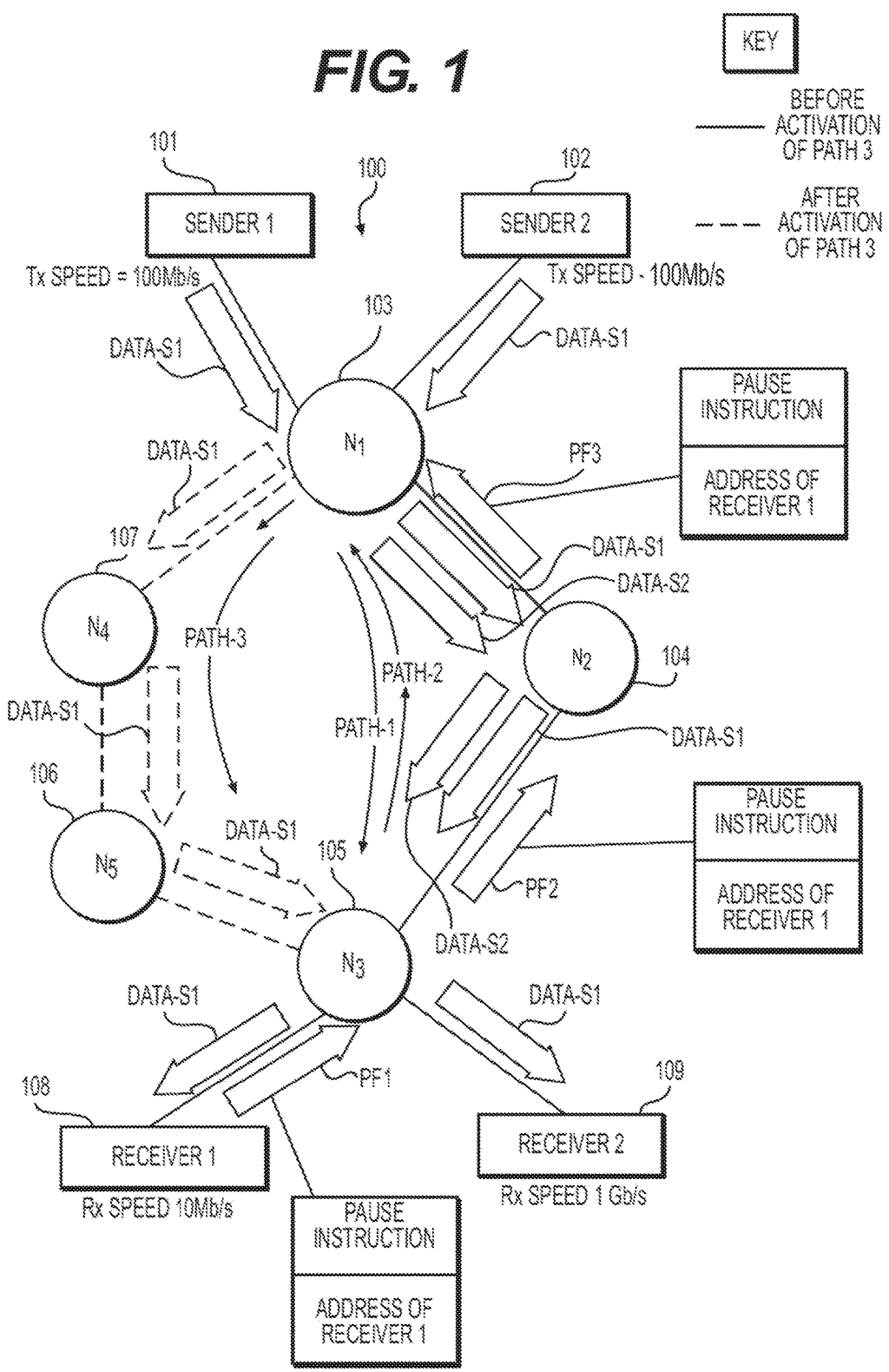
FIG. 1 illustrates a communication network according to an embodiment.

FIG. 1 shows a communication network 100 according to an embodiment. The communication network includes a plurality of senders (101 and 102), a plurality of receivers (108 and 109) and a plurality of nodes (103-107). In one embodiment, the senders and receivers can be any device capable of transmitting and/or receiving data in the communication network. The senders and receivers can be computers, mobile devices, servers, etc. The plurality of nodes 103-107 are switches or other entities that control and/or facilitate the flow of traffic between senders and receivers, for example.

Sender 101 transmits data packets DATA-S1 to receiver 108 through nodes 103, 104 and 105. Also, sender 102 transmits data packets DATA-S2 to receiver 109 through nodes 103, 104 and 105.

For example, sender 101 transmits data packets DATA-S1 to node 103 and node 103 receives and transmits the data packets DATA-S1 to node 104. Then, node 104 receives and transmits the data packets DATA-S1 to node 105. Subsequently, node 105 receives and transmits the data packets DATA-S1 to receiver 108. At the same time, sender 102 transmits data packet DATA-S2 to node 103, and node 103 receives and transmits the data packets DATA-S2 to node 104. Then, node 104 receives and transmits the data packets DATA-S2 to node 105. After that, node 105 receives and transmits the data packets DATA-S2 to receiver 109.

According to an embodiment, sender 101 may be capable sending data packets DATA-S1 @ 100 mb/s to a receiver 108 that is capable of receiving data packets only @ 10 mb/s, for example. This may result in receiver 108 not being able to handle the traffic load. In such a scenario where the receiver's 108 reception buffer can no longer accept data packets DATA-S1, the receiver 108 sends a pause packet or pause frame (PF1) to node 105 instructing node 105 to stop sending all data packets destined to receiver 108, until the pause is de-asserted. The pause frame (PF1) is a Bridge Protocol Data Unit (BPDU) packet and may include a Media Access Control (MAC) address of the receiver 108, in an embodiment. Also, in an embodiment, pause frame (PF1) is IEEE 802.3x compliant.

When node 105 receives the pause frame (PF1), in an embodiment, node 105 determines whether an alternate path is available for transmitting the data destined for receiver 108, whose address was included in the pause frame (PF1). In FIG. 1, node 105 determines that an alternate path to the receiver 108 is not available. As such, node 105 stops sending data packets destined to receiver 108.

In the meantime, node 105 continues to receive data packets DATA-S1 and DATA-S2 until a reception buffer of node 105 reaches a fullness threshold level. When the reception buffer of node 105 reaches the fullness threshold level, node 105 generates another pause frame (PF2) and sends the newly generated pause frame (PF2) to node 104, and requests node 104 to stop sending all traffic destined to node 105. The node 104 is the node immediately preceding node 105. The newly generated pause frame (PF2) includes an address of the receiver 108, instead of including the address of node 105. At a conventional node, the node that generates the pause frame inserts its own address as the source address. In contrast, node 105, in one embodiment, inserts the destination address of the data packets DATA-S1 (i.e., address of receiver 108) as the source address. By inserting the address of the receiver 108 that issued the initial pause frame, the node 104 (i.e., preceding node) receiving the pause frame (PF2) can determine if an alternate path to the receiver 108 is available, since the node 104 is now aware of which receiver (i.e., receiver 108) issued the initial pause frame. In one embodiment, the newly generated pause frame (PF2) includes the Media Access Control (MAC) address of the receiver 108.

When node 104 receives the pause frame (PF2), node 104 determines whether an alternate path is available for transmitting the data destined for receiver 108, whose address was included in the pause frame (PF2). In the example of FIG. 1, node 104 determines that an alternate path to the receiver 108 is not available. As such, node 104 stops sending data packets destined to node 105, because the reception buffer of node 105 has reached the fullness threshold level and cannot receive data packets until the reception buffer goes below the fullness threshold level.

In the meantime, node 104 continues to receive data packets DATA-S1 and DATA-S2 until a reception buffer of node 104 reaches a fullness threshold level. When the receive buffer of node 104 reaches the fullness threshold level, node 104 generates a third pause frame (PF3) and sends the newly generated third pause frame (PF3) to node 103, and requests node 103 to stop sending all traffic destined to node 104. Node 103 is the node immediately preceding node 104. The newly generated third pause frame (PF3) includes the address of the receiver 108, instead of including the address of node 104. By inserting the address of the receiver 108 that issued the initial pause frame, the node 103 (i.e., preceding node) receiving the pause frame (PF3) can determine if an alternate path to the receiver 108 is available, because the node 103 is now aware of which receiver (i.e., receiver 108) issued the initial pause frame. In one embodiment, the pause frame (PF3) includes the Media Access Control (MAC) address of the receiver 108.

When node 103 receives the third pause frame (PF3), node 103 determines whether an alternate path is available for transmitting the data destined for receiver 108, whose address was included in the pause frame (PF3). As seen in the example of FIG. 1, node 103 determines that an alternate path to the receiver 108 is available and activates the alternate path for transmitting data packets DATA-S1 from sender 101 to receiver 108. In particular, node 103 receives and transmits the data packets DATA-S1 to node 107. Then, node 107 receives and transmits the data packets DATA-S1 to node 106. Then, node 106 receives and transmits the data packets DATA-S1 to node 105. Subsequently, node 105 receives and transmits the data packets DATA-S1 to receiver 108.

In the meantime, sender 102 continues to transmit data packets DATA-S2 to receiver 109 via nodes 103, 104 and 105. For example, when the receive buffer of node 104 goes below the fullness threshold level, node 103 renews transmission to node 104 and transmits the data packets DATA-S2 to node 104. Then, when the receive buffer of node 105 goes below the fullness threshold level, node 104 renews transmission to node 105 and transmits the data packets DATA-S2 to node 105. Subsequently, node 105 receives and transmits the data packets DATA-S2 to receiver 109.

In an embodiment, when the receive buffer of node 104 goes below the fullness threshold level, the node 104 transmits a pause de-assertion signal to node 103, which notifies node 103 that node 104 is ready to receive data packets again. Similarly, when the receive buffer of node 105 goes below the fullness threshold level, the node 105 transmits a pause de-assertion signal to node 104, which notifies node 104 that node 105 is ready to receive data packets again.

Figure 2:
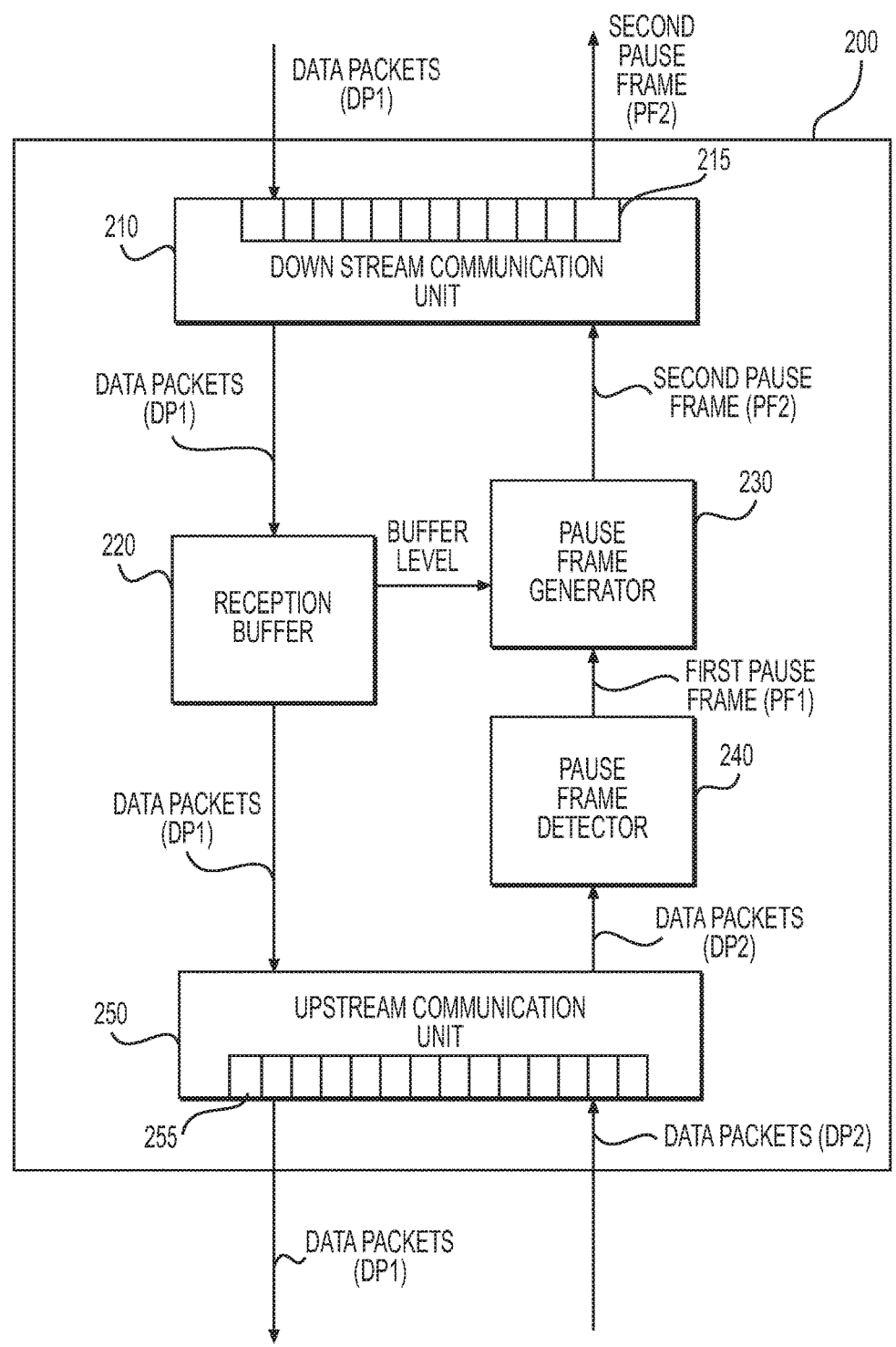
FIG. 2 illustrates a network device according to an embodiment.

FIG. 2 shows an entity 200 in a communication network according to an embodiment. The entity 200 includes a downstream communication unit 210, a reception buffer 220, a pause frame generator 230, a pause frame detector 240 and an upstream communication unit 250. In an embodiment, the entity 200 is disposed in nodes or switches, for example as a hardware or software module in a packet processor, that control and/or facilitate the flow of traffic between senders and receivers on a network. The terms "downstream" communication unit and the "upstream" communication unit have been selected for linguistic convenience only, and is not meant to be limitative. The terms "downstream" and "upstream" refer to where they are located the stream, relative to each other in the network.

In an embodiment, the downstream communication unit 210 receives a first traffic from another entity in the communication network that is upstream of the entity 200. For example, the downstream communication unit receives data packets (DP1) from a sender 101, nodes 103, or node 104, and forwards the data packets (DP1) to the reception buffer 220. The data packets (DP1) include a final destination address of the data packets (i.e., address of receiver 108). The downstream communication unit 210 may be implemented in a tangible sense as I/O ports 215 that are capable of receiving and transmitting data, in an embodiment.

The reception buffer 220 receives the data packets (DP1) and forwards the data packets (DP1) to an upstream communication unit 250. In one embodiment, the reception buffer 220 transmits a fullness level of the reception buffer to the pause frame generator 230.

The upstream communication unit 250 receives the data packets (DP1) from the reception buffer 220 and transmits the data packets (DP1) to another entity that is downstream of the entity 200. For instance, the upstream communication unit 250 transmits data packets (DP1) to node 104, node 105 or receiver 108.

In one embodiment, the upstream communication unit 250 receives a second traffic from the other entity (i.e., node 104, node 105 or receiver 108) that is downstream of the entity 200. For instance, the upstream communication unit 250 receives a data packet (DP2) from the entity that is downstream of the entity 200 and forwards the data packet (DP2) to the pause frame detector 240. The upstream communication unit 250 may be implemented in a tangible sense as I/O ports 255 that are capable of receiving and transmitting data.

The pause frame detector 240 receives the data packet (DP2) from the upstream communication unit 240, and detects that the received data packet is a pause frame (PF1). Subsequently, the pause frame detector 240 forwards the detected pause frame (PF1) to the pause frame generator 230. The pause frame (PF1) includes an address of the entity that is the final destination of the data packets (DP1). For instance, the pause frame (PF1) includes the address of the receiver 108.

In an embodiment, the pause frame generator 230 receives the pause frame (PF1) and generates a second pause frame (PF2). The generated pause frame also includes an address of the address of the entity that is the final destination of the data packets (DP1). Then, the generated pause frame (PF2) is frame is forwarded to the downstream communication unit 210, which forwards the pause frame (PF2) to an entity connected immediately preceding the entity 200.

In another embodiment, the pause frame generator 230 determines whether the buffer level of the reception buffer 220 is equal to or above a fullness threshold level. If the pause frame generator 230 determines that the buffer level of the reception buffer 220 is equal to or above a fullness threshold level, and if the pause frame generator 230 receives the pause frame (PF1), the pause frame generator 230 generates a second pause frame (PF2). The generated pause frame also includes an address of the address of the entity that is the final destination of the data packets (DP1). Then, the generated pause frame (PF2) is forwarded to the downstream communication unit 210, which forwards the pause frame (PF2) to an entity connected immediately preceding the entity 200 in the upstream direction. For instance, the downstream communication unit transmits the pause frame (PF2) to sender 101, node 103 or node 104.

Figure 3:
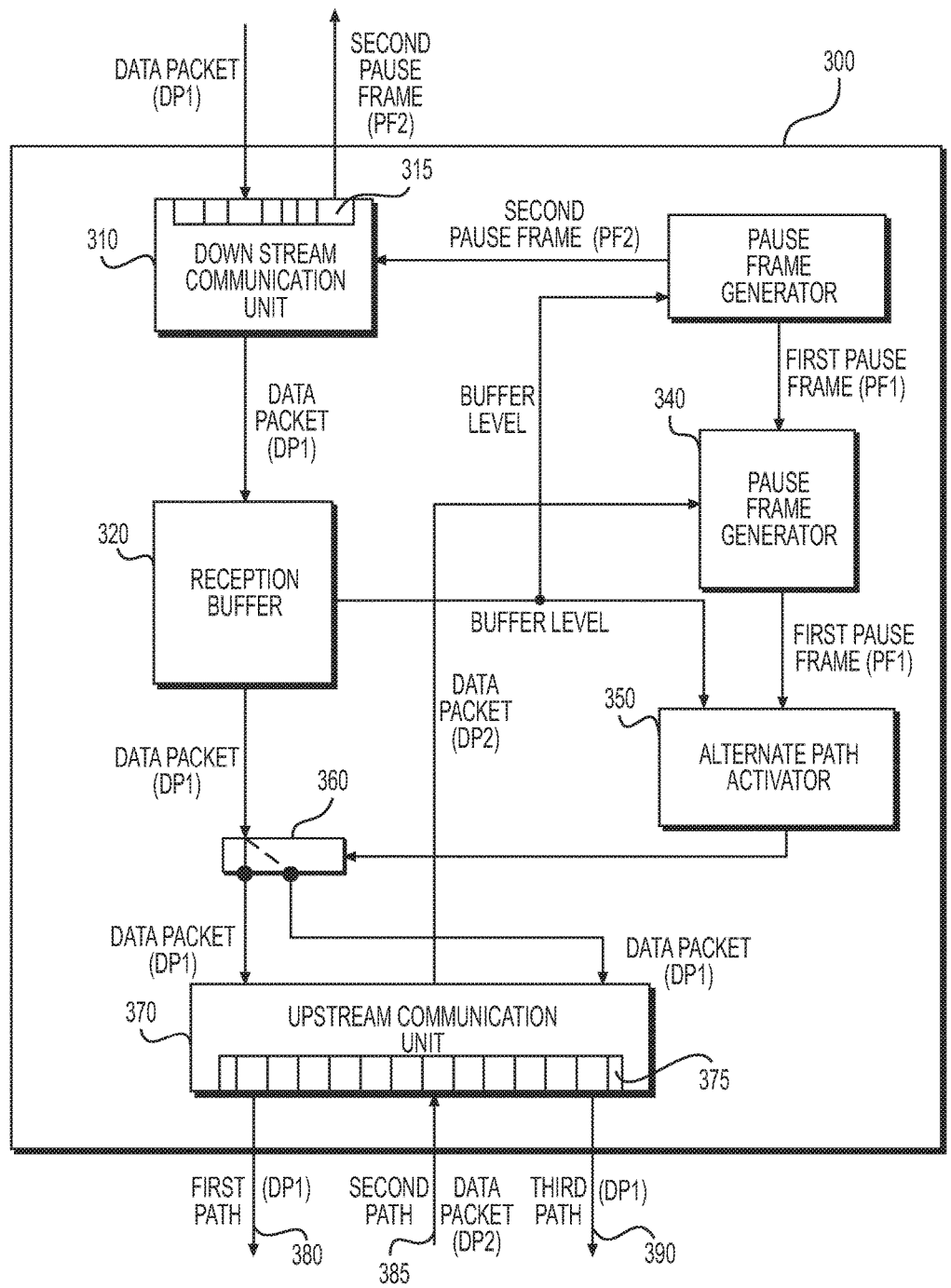
FIG. 3 illustrates a network device according another embodiment.

FIG. 3 shows an entity 300 in a communication network according to another embodiment. The entity includes a downstream communication unit 310, a reception buffer 320, a pause frame generator 330, a pause frame detector 340, an alternative path activator 350, switching unit 360 and data and an upstream communication unit 370.

In an embodiment, the downstream communication unit 310, reception buffer 320, and pause frame generator 330 each provide a similar functionality as the corresponding downstream communication unit 210, reception buffer 220 and pause frame generator 230 in entity 200. The downstream communication unit 310 may be implemented in a tangible sense as I/O ports 315 that are capable of receiving and transmitting data, in an embodiment.

In an embodiment, the upstream communication unit 370 receives the data packets (DP1) from the reception buffer 320 and transmits the data packets (DP1) to another entity that is downstream of the entity 300 via a first path 380. Further, the upstream communication unit 250 receives a second traffic from the other entity that is downstream of the entity 300 via a second path 385.

The upstream communication unit 370 receives a data packet (DP2) from the entity that is downstream of the entity 300 and forwards the data packet (DP2) to the pause frame detector 340. The upstream communication unit 370 may be implemented in a tangible sense as I/O ports 375 that are capable of receiving and transmitting data, in an embodiment.

The pause frame detector 340 receives the data packet (DP2) from the upstream communication unit 370, and detects that the received data packet is a pause frame (PF1). Subsequently, the pause frame detector 340 forwards the detected pause frame (PF1) to the alternate path activator 350. The pause frame (PF1) includes an address of the entity that is the final destination of the data packets (DP1). For instance, in an embodiment, the pause frame (PF1) includes the address of the receiver 108.

In an embodiment, the alternate path activator 350 receives the pause frame (PF1) and determines an originator of the pause frame (PF1). The originator is determined by checking the source address of the pause frame (PF1), which is the address of the entity that is the final destination of the data packets (DP1). As such, the alternate path activator 350 determines that the entity that is the final destination of the data packets (DP1) is the originator of the pause frame.

After determining the originator of the pause frame, the alternate path activator activates an alternate path for transmitting the data packets (DP1). In an embodiment, the alternate path activator 350 selects and activates an alternate tree flow that was previously determined using STP protocol. The alternate path activator 350 activates the alternate path by sending an activation signal to a switching unit 360.

The switching unit 360 detects the data packets (DP1) with the address of the entity that as the final destination of the data packets (DP1), switches the path of the data packets from the first path to a third path 390 and forwards data packets (DP1) to the upstream communication unit 370.

The communication unit 370 transmits the data packets (DP1) to the receiver 108 via the third path (i.e., via nodes 106 and 107 in FIG. 1).

In another embodiment, entity 300 may include a determination unit that determines whether an alternate path is available for transmitting the data packets DP1 destined for receiver 108, whose address was included in the pause frame detected by the pause frame detector (PF1).

If the determination unit determines that an alternate path to the receiver 108 is available, the first pause frame (PF1) is transmitted to the alternate path activator. If the determination unit determines that an alternate path to the receiver 108 is not available, the first pause frame (PF1) is transmitted to the pause frame generator 330 for generating the second pause frame (PF2).

Figure 4:
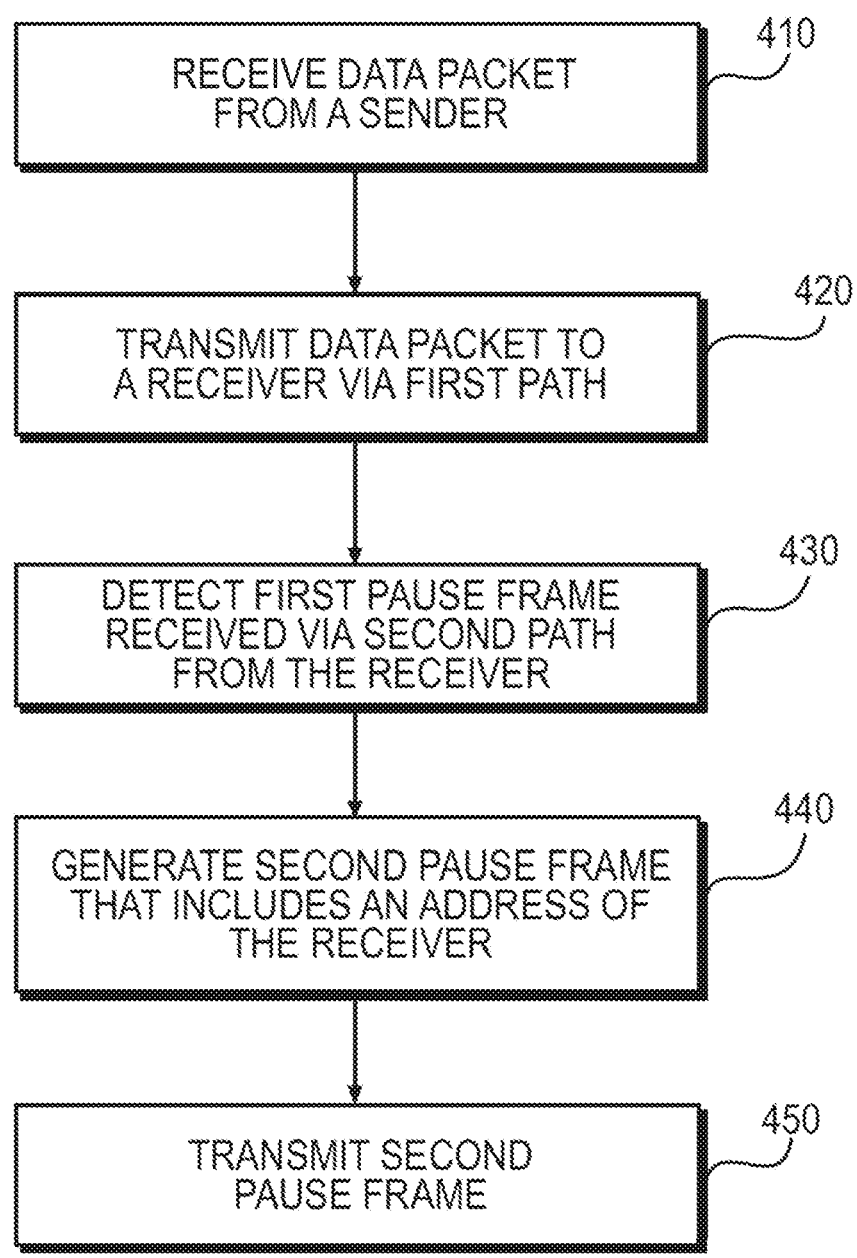
FIG. 4 illustrates a method for controlling a traffic flow according to an embodiment.

FIG. 4 illustrates a method for controlling a traffic flow according to an embodiment.

At 410, data packets are received from a sender 101. The data packets being destined for a receiver 108 along a first network path.

At 420, the data packets are transmitted to the receiver via the first network path.

At 430, a first pause frame received from the receiver 108 via a second path is detected. The first pause frame received from the receiver includes a MAC address of the receiver 108 as the source of the first pause frame. The operation of detecting the first pause frame includes determining the MAC address of the receiver 108 included in the first pause frame as the source address.

At 440, after obtaining the first pause frame and determining the MAC address of the receiver 108 (i.e., originator of the first pause frame), a second pause frame is generated. The generated second pause frame includes an address of the receiver 108. Then, at 450, the generated second pause frame is transmitted to a node or entity connected immediately preceding the entity that generates the second pause frame.

In another embodiment, at 440, a determination as to whether the buffer level of the reception buffer 220 is equal to or above a fullness threshold level is performed. If it is determined that the buffer level of the reception buffer 220 is equal to or above a fullness threshold level, and if the pause frame is detected, the second pause frame generated.

Figure 5:
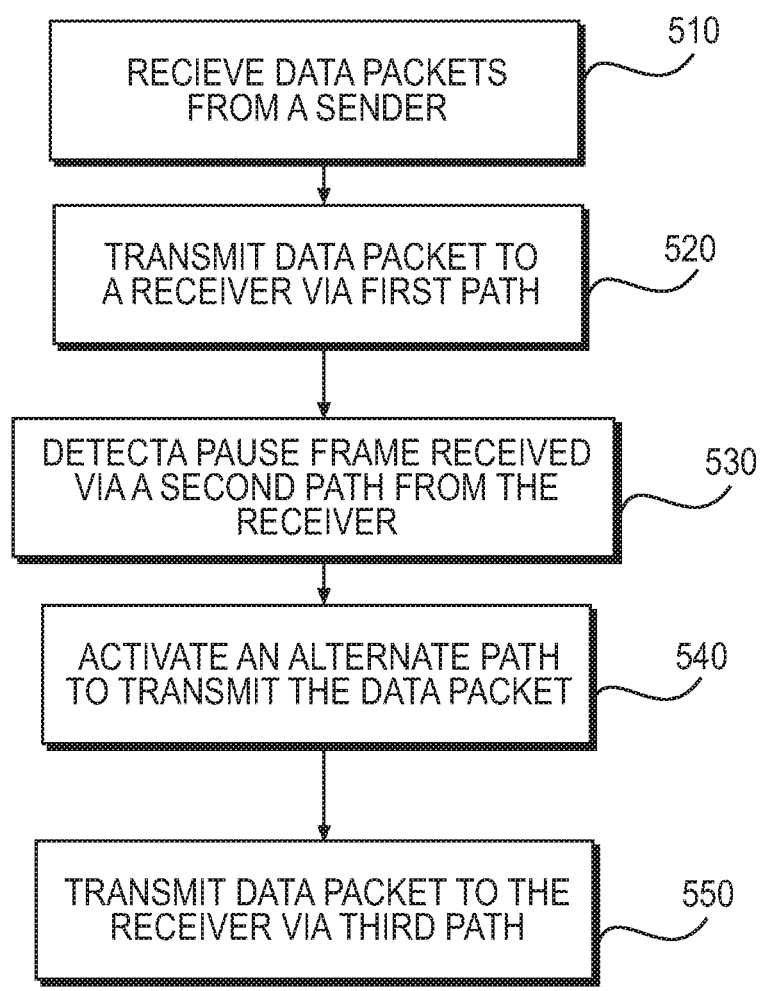
FIG. 5 illustrates a method for controlling a traffic flow according to another embodiment.

FIG. 5 illustrates a method for controlling a traffic flow according to another embodiment.

At 510, data packets are received from a sender 101. The data packets being destined for a receiver 108 along a first network path.

At 520, the data packets are transmitted to the receiver via the first network path.

At 530, a pause frame received from the receiver 108 via a second path is detected. The receiver 108 generates a pause frame when a reception buffer reaches a fullness threshold level. The pause frame generated by the receiver includes a MAC address of the receiver 108 as the source of the pause frame. The operation of detecting the pause frame includes determining the MAC address of the receiver 108 included in the pause frame as the source address.

At 540, after obtaining the pause frame and determining the MAC address of the receiver 108 (i.e., originator of the pause frame), an alternate path for transmitting the data packets from sender 101 to receiver 108 is activated. In an embodiment, the alternate path is activated by selecting and activating an alternate tree flow that was previously determined using STP protocol.

At 550, the data packets from sender 101 are transmitted to receiver 108 via a third path using the alternate tree flow.

Although the inventive concept has been described above with respect to the various embodiments, is noted that there can be a variety of permutations and modifications of the described illustrative features by those who are familiar with this field, without departing from the technical ideas and scope of the features, which shall be defined by the appended claims.

A method of one or more illustrative embodiments may be recorded as computer-readable program codes in non-transitory computer-readable media (CD ROM, random access memory (RAM), read-only memory (ROM), floppy disks, hard disks, magneto-optical disks, and the like) including program instructions to implement various operations embodied by a computer. Alternatively, the method can be carried out in one or more modules of dedicated hardware devices, such as a packet processor, or in a suitable programmable processor.

Although the drawings describe the operations in a specific order, one should not interpret that the operations are performed in a specific order as shown in the drawings or successively performed in a continuous order, or all the operations are performed to obtain a desired result. Multitasking or parallel processing may be advantageous under any environment. Also, it should be understood that all illustrative embodiments do not require the distinction of various system components made in this description. The program components and systems may be generally implemented, for example, as a single software product or multiple software product packages.

A number of examples have been described above. Nevertheless, it is noted that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. A network device in a computer network, the network device comprising:
   an ingress circuit configured to:
      receive first network traffic from a first transmitter of the first network traffic, the first network traffic being destined for a first receiver, different than the network device, along a first network path, and
      receive second network traffic from the first receiver different than the network device, the second network traffic being destined for at least the first transmitter along a second network path;
   a pause frame detection processor configured to detect in the second network traffic a first pause frame for controlling a flow of the first network traffic, the first pause frame specifically instructing the network device to pause the first network traffic along the first network path;
   a pause frame generating processor configured to process the detected first pause frame, determine the first receiver different than the network device as an originator of the first pause frame, and generate a second pause frame that includes an address included in the first pause frame, the address corresponding to the first receiver different than the network device, in response to determining the first receiver different than the network device as the originator of the first pause frame, the second pause frame for transmission, by the network device, to pause the flow of the first network traffic to the first receiver different than the network device, and
   an egress circuit configured to transmit the second pause frame in the second network traffic that is destined for at least the first transmitter along the second network path to pause the flow of the first network traffic to the first receiver different than the network device.

2. The network device of claim 1, wherein the pause frame generating processor is further configured to include a Media Access Control (MAC) address of the first receiver in the second pause frame.

3. The network device of claim 2, wherein the pause frame generating processor is further configured to include the MAC address of the first receiver in a source field of the second pause frame.

4. The network device of claim 1, wherein the pause frame generating processor is further configured to generate an IEEE 802.3x compliant pause frame.

5. The network device of claim 1, wherein the pause frame generating processor generates the second pause frame in response to a fullness level of a queue corresponding to the first network traffic.

6. The network device of claim 1, wherein the ingress circuit is compliant with spanning tree protocol.

7. The network device of claim 1, wherein the ingress circuit is further configured to continue reception of a fourth network traffic from a second transmitter, the fourth network traffic being destined for a second receiver, and to continue transmitting the fourth network traffic along the first network path, after activating a third network path that is different from the first network path, for transmitting the first network traffic to the first receiver, in response to receiving the first pause frame.

8. The network device of claim 1, further comprising:
   a packet processor, which includes the pause frame processor that processes the detected first pause frame, wherein the packet processor is configured to perform additional processing operations on received packets.

9. A method of controlling a traffic flow by a network device in a computer network, the method comprising:
   receiving by an ingress circuit of the network device:
      first network traffic from a first transmitter of the first network traffic, the first network traffic being destined for a first receiver, different than the network device, along a first network path; and
      second network traffic from the first receiver different than the network device, the second network traffic being destined for at least the first transmitter along a second network path;
   detecting, by a pause frame detection processor of the network device, a first pause frame in the second network traffic for controlling a flow of the first network traffic, the first pause frame specifically instructing the network device to pause the first network traffic along the first network path;
   processing, by a pause frame generating processor of the network device, the detected first pause frame, determining the first receiver different than the network device as an originator of the first pause frame and generating a second pause frame that includes an address included in the first pause frame, the address corresponding to the first receiver different than the network device, in response to determining the first receiver different than the network device as the originator of the first pause frame, the second pause frame for transmission, by the network device, to pause the flow of the first network traffic to the first receiver different than the network device, and
   transmitting, by an egress circuit of the network device, the second pause frame in the second network traffic that is destined for at least the first transmitter to pause the flow of the first network traffic to the first receiver different than the network device.

10. The method of claim 9, wherein the processing comprises modifying a source address of the second pause frame to include a Media Access Control (MAC) address of the first receiver.

11. The method of claim 9, wherein the processing comprises modifying the second pause frame to be IEEE 802.3x compliant.

12. The method of claim 9, further comprising activating a third network path, that is different from the first network path, for transmitting the first network traffic to the first receiver, in response to receiving the first pause frame.

13. The method of claim 9, the processing further comprising generating the second pause frame in response to a fullness level of a queue corresponding to the first network traffic.

14. The method of claim 12, further comprising determining a route of the third network path by a multiple instance spanning tree protocol.

15. The method of claim 12, further comprising continuing reception of a fourth network traffic from a second transmitter, the fourth network traffic being destined for a second receiver, and continuing transmission of the fourth network traffic along the first network path, after the activation of the third network path.

16. A method of controlling a traffic flow by a network device in a computer network, the method comprising:
   receiving a first pause frame at a first port of the network device, from a first node in the computer network directly coupled to the network device, the first pause frame specifically instructing the network device to pause network traffic along a first network path;
detecting, by the network device, a source Media Access Control (MAC) address of the first pause frame as an originator MAC address corresponding to an originator device different than the network device;
generating, by the network device, a second pause frame having the originator MAC address, corresponding to the originator device different than the network device, as a respective source MAC address of the second pause frame, in response to detecting the source MAC address of the first pause frame as the originator MAC address; and
sending the second pause frame via a second port different from the first port to a second node in the computer network coupled to the network device along a second network path to pause a flow of the network traffic along the first network path to the originator MAC address.

17. A network device in a computer network, the network device comprising:
an ingress circuit configured to receive a first pause frame at a first port from a first node in the computer network coupled to the network device, the first pause frame specifically instructing the network device to pause network traffic along a first network path;
an address detection circuitry configured to detect a source Media Access Control (MAC) address of the first pause frame as an originator MAC address corresponding to an originator device different than the network device;
a pause frame generating processor configured to generate a second pause frame having the originator MAC address, corresponding to the originator device different than the network device, as a respective source MAC address of the second pause frame, in response to detecting the source MAC address of the first pause frame as the originator MAC address; and
an egress circuit configured to transmit the second pause frame via a second port different from the first port to a second node in the computer network coupled to the network device along a second network path to pause a flow of the network traffic along the first network path to the originator MAC address.

18. A method of controlling a traffic flow by a network device in a computer network, the method comprising:
receiving a first data frame at a first port of the network device;
detecting a destination address of the first data frame as a respective destination Media Access Control (MAC) address;
transmitting the first data frame via a second data port along a first network path;
receiving, by the network device, a pause frame from a node in the computer network directly coupled to the network device, the first pause frame specifically instructing the network device to pause network traffic along the first network path;
detecting a source MAC address of the pause frame as an originator MAC address, the originator MAC address being different from a MAC address of the node;
receiving a second data frame at the first port;
detecting a destination address of the second data frame as a respective destination MAC address;
when the originator MAC address of the pause frame matches the respective destination address of the second data frame, transmitting the second data frame via a third data port along a second network path different from the first network path.

19. A network device in a computer network, the network device comprising:
an ingress circuit configured to:
receive a first data frame at a first port;
receive a pause frame from a node in the computer network directly coupled to the network device, the first pause frame specifically instructing the network device to pause network traffic along a first network path; and
receive a second frame at the first port;
a detecting processor configured to:
detect a destination address of the first data frame as a respective destination Media Access Control (MAC) address;
detect a source MAC address of the pause frame as an originator MAC address, the originator MAC address being different from a MAC address of the node; and
detect a destination address of the second data frame as a respective destination MAC address; and
an egress circuit configured to:
transmit the first data frame via the second data port along the first network path; and
when the originator MAC address of the pause frame matches the respective destination address of the second data frame, transmit the second data frame via a third data port along a second network path different from the first network path.

20. A method of controlling a traffic flow by a network device in a computer network, the method comprising:
receiving a pause frame, by the network device, from a node in the computer network directly coupled to an output data port the network device, the first pause frame specifically instructing the network device to pause network traffic along a first network path;
detecting a source Media Access Control (MAC) address of the pause frame as an originator MAC address, the originator MAC address being different from a MAC address of the node;
receiving, by the network device, an incoming data frame;
detecting a destination address of the incoming data frame as a respective destination MAC address; and
when the originator MAC address of the pause frame matches the respective destination MAC address of the data frame, switching transmission of the data frame to an alternative data output port different from an output data port used for transmitting a previous data frame having the same destination MAC address, and
transmitting the data frame via the alternative data output port along a second network path different from the first network path.

21. A network device in a computer network, the network device comprising:
an ingress circuit configured to:
receive an incoming data frame; and
receive a pause frame from a node in the computer network directly coupled to an output data port of the network device, the first pause frame specifically instructing the network device to pause network traffic along a first network path; and;
a detecting processor configured to:
detect a destination address of the incoming frame as a respective destination Media Access Control (MAC) address; and detect a source MAC address of the pause frame as an originator MAC address, the originator MAC address being different from a MAC address of the node;

an activation processor configured to, when the originator MAC address of the pause frame matches the respective destination MAC address of the data frame, switch transmission of the data frame to an alternative data output port different from an output data port used for transmitting a previous data frame having the same destination MAC address; and an egress circuit configured to transmit the data frame via the alternative data output port along a second network path different from the first network path.

* * * * *